Aug. 29, 1933. J. HASSLER 1,924,241
MOLE TRAP
Filed Feb. 26, 1932 2 Sheets-Sheet 1
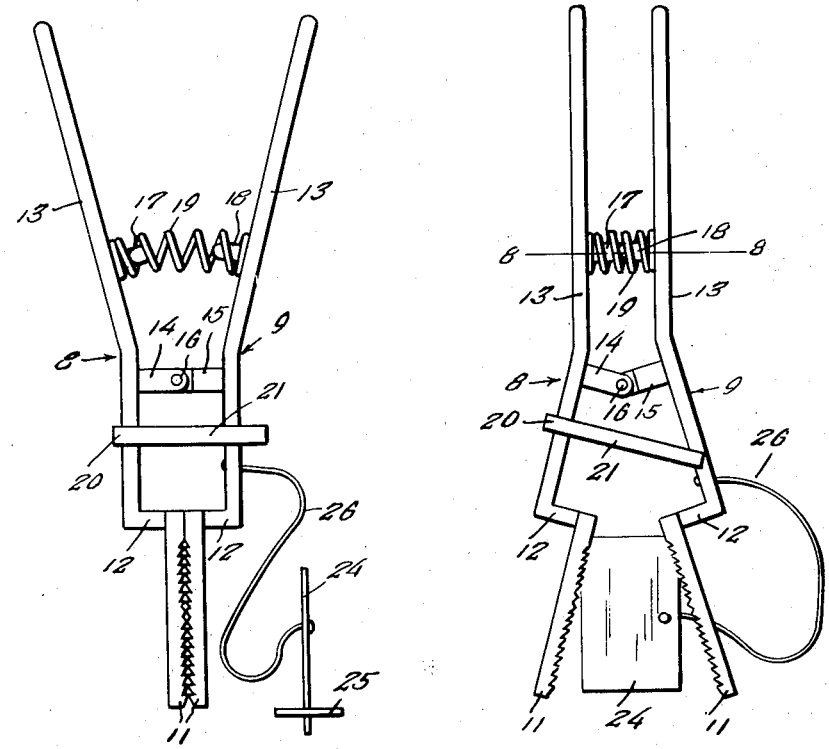
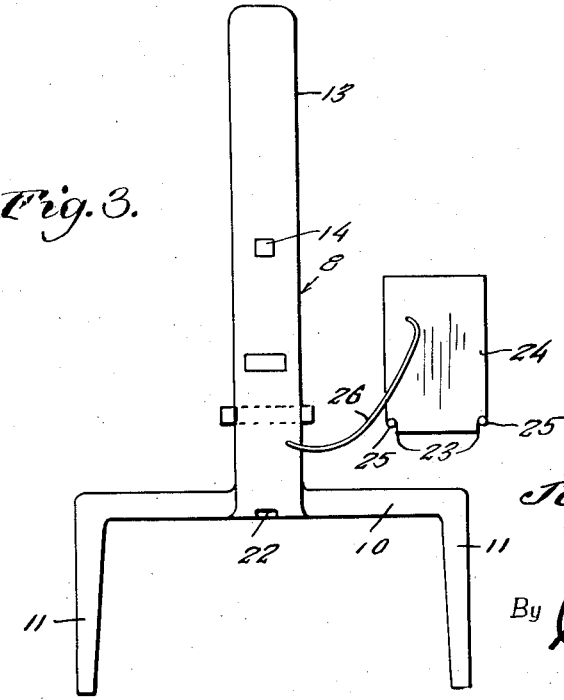
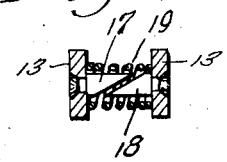
Inventor
John Hassler
By Clarence A. O'Brien
Attorney Aug. 29, 1933.  J. HASSLER  1,924,241
MOLE TRAP
Filed Feb. 26, 1932  2 Sheets-Sheet 2
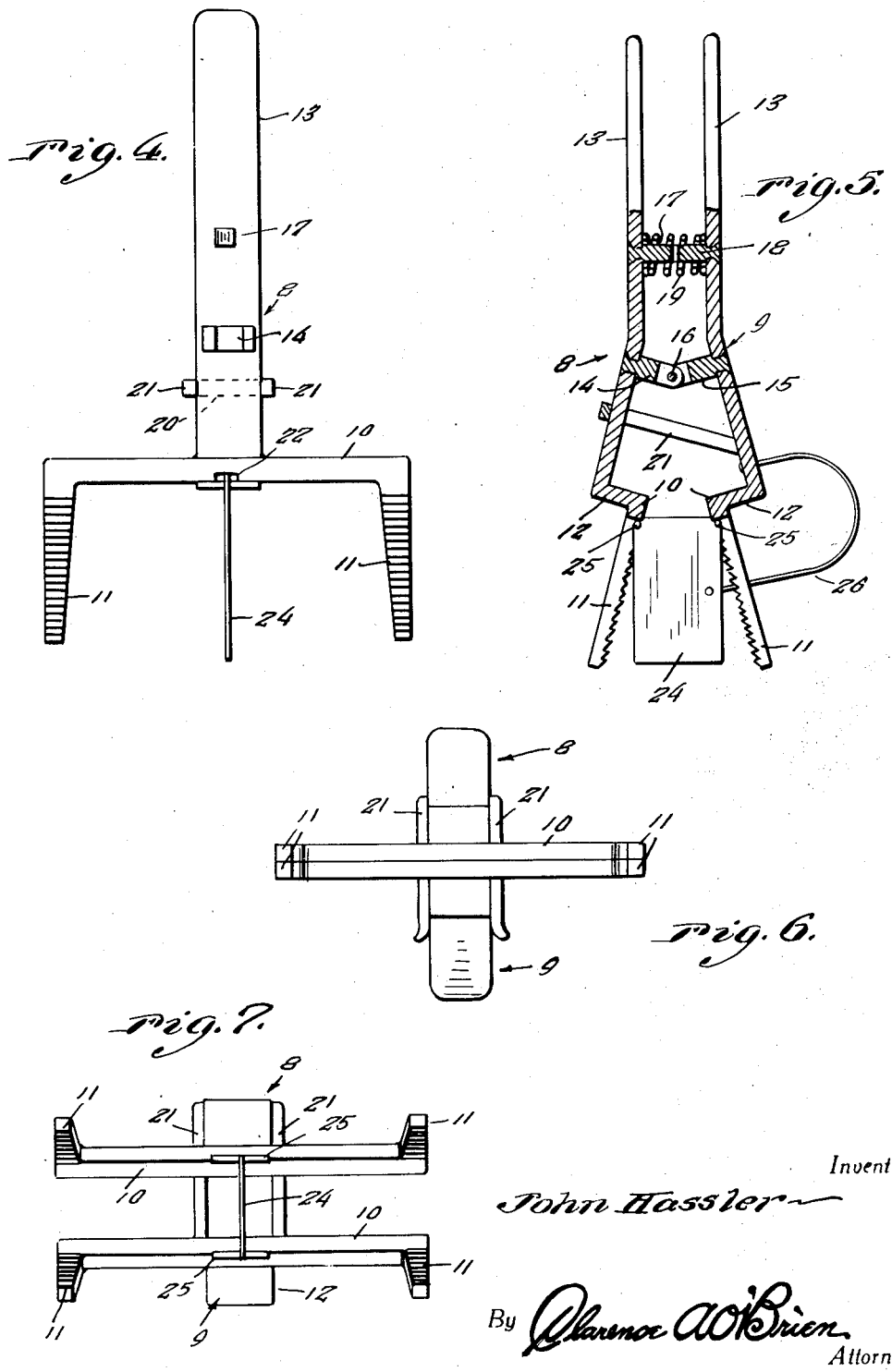
Inventor
John Hassler
By Clarence A. O'Brien
Attorney

Patented Aug. 29, 1933

1,924,241

UNITED STATES PATENT OFFICE 1,924,241

MOLE TRAP

John Hassler, Parkersburg, W. Va.

Application February 26, 1932. Serial No. 595,381

1 Claim. (Cl. 43—94)

This invention relates to an improved animal trap which is especially designed for catching moles and it is therefore so designed as to permit the trapping members thereof to be practically concealed and submerged at a point of vantage in the hole in which the mole is likely to be found.

Briefly, the trap comprises a pair of pivotally connected companion sections having their lower end portions fashioned to provide gripping jaws, spring means for forcing the jaws forcibly together to grasp the animal therebetween, and simple and effective animal actuated trip means for holding the jaws apart when the trap is set and allowing the jaws to snap together when the trap is released.

The specific parts, their configuration and mechanical association and arrangement will become more readily apparent from the following description and drawings.

In the drawings:

Figure 1 is an end elevational view showing the trap released, that is, in its normal unset position.

Figure 2 is a view like Figure 1, showing the trap set for making a catch.

Figure 3 is a side elevation of Figure 1 observing the same in a direction from right to left.

Figure 4 is an elevational view of one of the sections showing the operative position of the trip plate.

Figure 5 is a view in section and elevation showing the trap set and ilustrating more clearly the configuration and association of parts.

Figure 6 is a bottom plan view of the structure shown in Figure 1.

Figure 7 is a bottom plan view of the structure shown in Figure 2.

Figure 8 is a detail section on the line 8—8 of Figure 2.

Referring now to the drawings by reference characters, it will be observed that the numerals 8 and 9 designate the companion or complimental sections of the improved trap. Each section is in the nature of a lever and comprises a U-shaped member 10 whose end portions 11 serve as gripping jaws. The opposed faces thereof are serrated to provide anti-slipping teeth.

Joined to the intermediate portion of each member 10 through the medium of the short laterally directed extremity 12 is a handle 13. The intermediate portions of the handles are provided with connecting brackets 14 and 15 pivotally joined together as at 16. This provides the side fulcrum connection between the two sections. Moreover, the intermediate portions of the handles are provided with inwardly directed lugs 17 and 18 to accommodate the ends of an expansion coiled spring 19 which functions to forcibly clamp the jaws together. Then too, one of the handles is provided with a stay device 20 of general U-shaped form having its arm portions 21 straddling the two handles and serving as guides to maintain the handles in proper alinement as they move toward and from each other during the active periods of operation.

The U-shaped members of the jaws are provided with notches 22 which serve as keeper seats for reception of the corner portion 23 of the trip plate 24. The plate is also provided with a pair of abutment pins 25 which occupy the position seen in Figure 7 when the trap is set. This trip plate is connected to one of the handles through the medium of a cord 26, thereby keeping the plate in position for ready usage.

In setting the trap, the handles are pressed together against the tension of the spring 19. This obviously spreads the animal gripping jaws. While holding the handles in this manner, the corner portions 23 of the pendulous-like trip plate 24 are seated in the keeper notches 22 as seen in Figure 5. The pins 25 bridge the notches and abut the adjacent portions of the jaws so as to sustain the plate in a substantially centralized perpendicular state. The trap thus set is placed in position in the hole. When this is accomplished the jaws spread apart are submerged in the mouth of the mole hole and it is obvious that when the mole strikes the plate with sufficient force to dislodge it from the keeper notches 22, the spring 19 comes automatically into play to quickly and forcibly clamp the jaws against that portion of the animal then located between said jaws.

It is thought that the description taken in connection with the drawings will enable a clear understanding of the invention to be had. Therefore, a more lengthy description is thought unnecessary.

While the preferred embodiment of the invention has been shown and described, it is to be understood that minor changes coming within the field of invention claimed may be resorted to if desired.

I claim:

A trap of the class described comprising a pair of members each comprising an elongated handle part, a U-shaped jaw part and a short outwardly extending part connecting the central portion of the bight of the jaw part with the handle part, means for pivotally connecting together the handle parts intermediate their ends, a U-shaped guiding member having its bight passing across and connected with the outer face of one of the handle parts with its limbs straddling the handle parts, a spring located between the handle parts for holding the jaw parts in closed position, trigger means for holding the jaw parts separated, such trigger means comprising a plate having recesses in the corners thereof at one end thereof and the bight parts of the jaw members having keeper recesses therein, the inner corner walls of which are adapted to engage walls of the recesses in the plate for holding the jaw parts separated with the plate located in the space between the jaw parts, laterally extending pins passing through the plate adjacent the recesses therein and bridging the keeper recesses of the jaw parts.

JOHN HASSLER.